(12) United States Patent
Tetrault

(10) Patent No.: US 11,807,379 B2
(45) Date of Patent: Nov. 7, 2023

(54) TURBOFAN ENGINE, NACELLE THEREOF, AND ASSOCIATED METHOD OF OPERATION

(71) Applicant: PRATT & WHITNEY CANADA CORP., Longueuil (CA)

(72) Inventor: Philippe-André Tetrault, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 339 days.

(21) Appl. No.: 16/774,778

(22) Filed: Jan. 28, 2020

(65) Prior Publication Data

US 2021/0163146 A1 Jun. 3, 2021

Related U.S. Application Data

(63) Continuation of application No. 16/699,001, filed on Nov. 28, 2019, now abandoned.

(51) Int. Cl.
*B64D 33/02* (2006.01)
*B64D 15/04* (2006.01)
*F02C 6/08* (2006.01)
*F02C 7/047* (2006.01)
*F02K 3/06* (2006.01)

(52) U.S. Cl.
CPC ............. *B64D 33/02* (2013.01); *B64D 15/04* (2013.01); *F02C 6/08* (2013.01); *B64D 2033/0206* (2013.01); *B64D 2033/0233* (2013.01); *B64D 2033/0286* (2013.01); *F02C 7/047* (2013.01); *F02K 3/06* (2013.01); *F05D 2220/323* (2013.01); *F05D 2220/36* (2013.01)

(58) Field of Classification Search
CPC .. B64C 1/18; B64F 5/10; B64D 33/02; B64D 2033/0286; F02K 3/06; F02K 2220/323
See application file for complete search history.

(56) References Cited

U.S. PATENT DOCUMENTS

| | | | |
|---|---|---|---|
| 3,933,327 A | | 1/1976 | Cook et al. |
| 4,674,714 A | | 6/1987 | Cole et al. |
| 4,688,745 A | * | 8/1987 | Rosenthal Herman A. ................ B64D 15/04 244/134 R |
| 4,738,416 A | | 4/1988 | Birbragher |
| 5,088,277 A | * | 2/1992 | Schulze .................. F02C 7/047 60/39.093 |
| 5,257,498 A | * | 11/1993 | Nikkanen .............. B64D 15/04 60/39.093 |

(Continued)

FOREIGN PATENT DOCUMENTS

GB 2518232 3/2015

*Primary Examiner* — Michael H Wang
(74) *Attorney, Agent, or Firm* — NORTON ROSE FULBRIGHT CANADA LLP

(57) ABSTRACT

The nacelle can have an inlet portion having a duct wall and an outer skin, the duct wall being annular around an axis and having a surface forming a radially-outer delimitation to a gas path upstream of a fan area, the duct wall extending from a rounded inlet edge of the nacelle to the fan area, a cavity located inside the inlet portion, a compressed air inlet leading into the cavity, and an outlet fluidly connecting the cavity to the gas path, the outlet having a plurality of apertures disposed circumferentially around the duct wall, the apertures sloping circumferentially.

20 Claims, 4 Drawing Sheets

(56) References Cited

U.S. PATENT DOCUMENTS

| | | | | |
|---|---|---|---|---|
| 5,322,246 | A | * 6/1994 | Henne | B64D 15/00 |
| | | | | 244/134 E |
| 5,322,426 | A | 6/1994 | Henne et al. | |
| 5,694,763 | A | 12/1997 | Amelio et al. | |
| 6,131,855 | A | * 10/2000 | Porte | B64D 29/00 |
| | | | | 244/134 B |
| 6,561,760 | B2 | * 5/2003 | Wadia | F04D 29/584 |
| | | | | 415/145 |
| 6,698,691 | B2 | * 3/2004 | Porte | B64D 33/02 |
| | | | | 244/134 B |
| 7,328,623 | B2 | * 2/2008 | Slagle | G01K 13/02 |
| | | | | 374/E13.006 |
| 9,938,855 | B2 | * 4/2018 | Alecu | F02C 7/18 |
| 10,487,738 | B2 | 11/2019 | Versaevel et al. | |
| 2014/0263837 | A1 | * 9/2014 | Sternberger | B64D 15/04 |
| | | | | 244/134 B |
| 2015/0007895 | A1 | * 1/2015 | Herbaut | F02C 7/047 |
| | | | | 137/15.1 |
| 2016/0052621 | A1 | * 2/2016 | Ireland | F04D 29/684 |
| | | | | 137/13 |
| 2017/0043877 | A1 | * 2/2017 | Bouillon | B64D 33/02 |
| 2020/0025072 | A1 | * 1/2020 | Mackin | F01D 17/105 |

\* cited by examiner

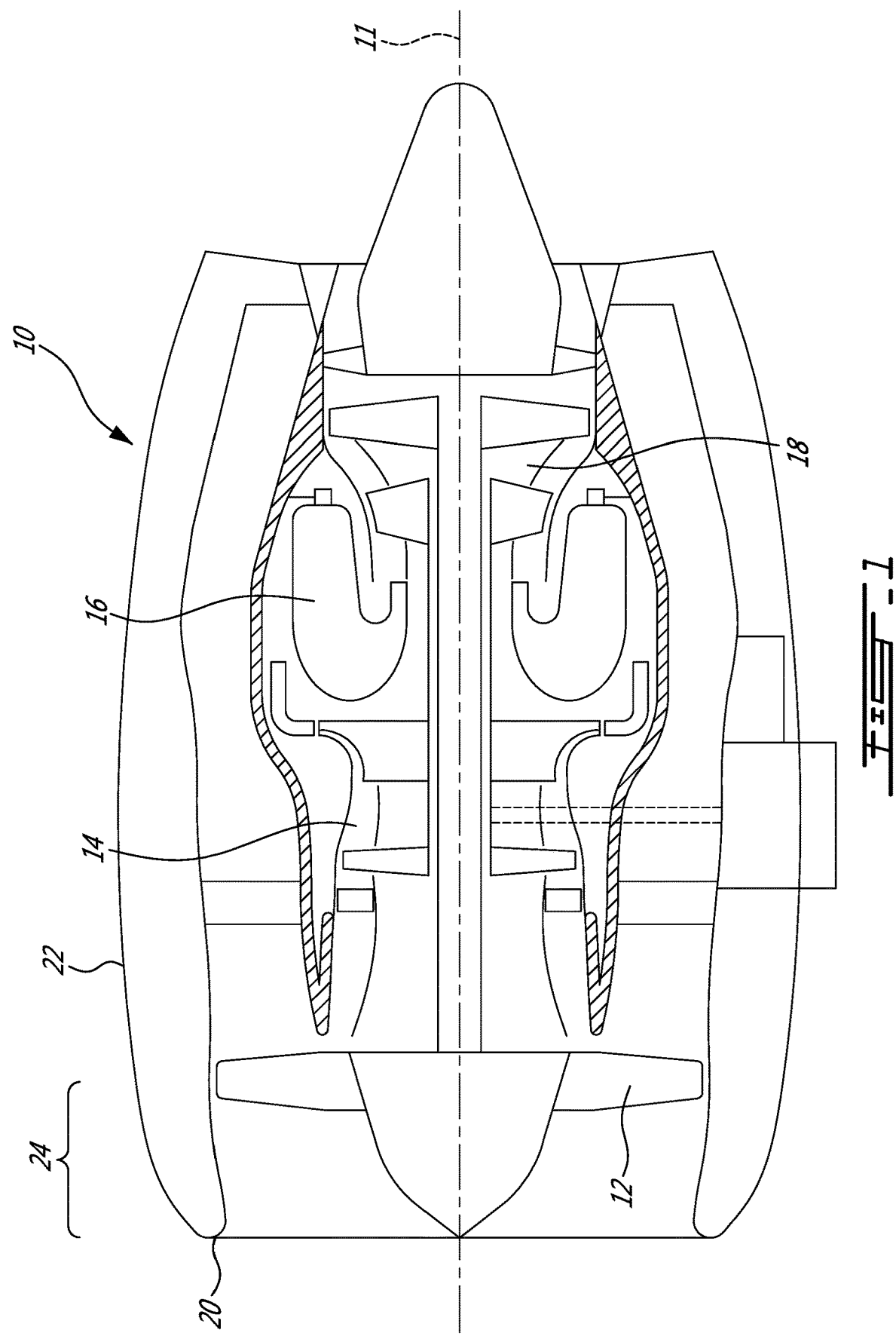

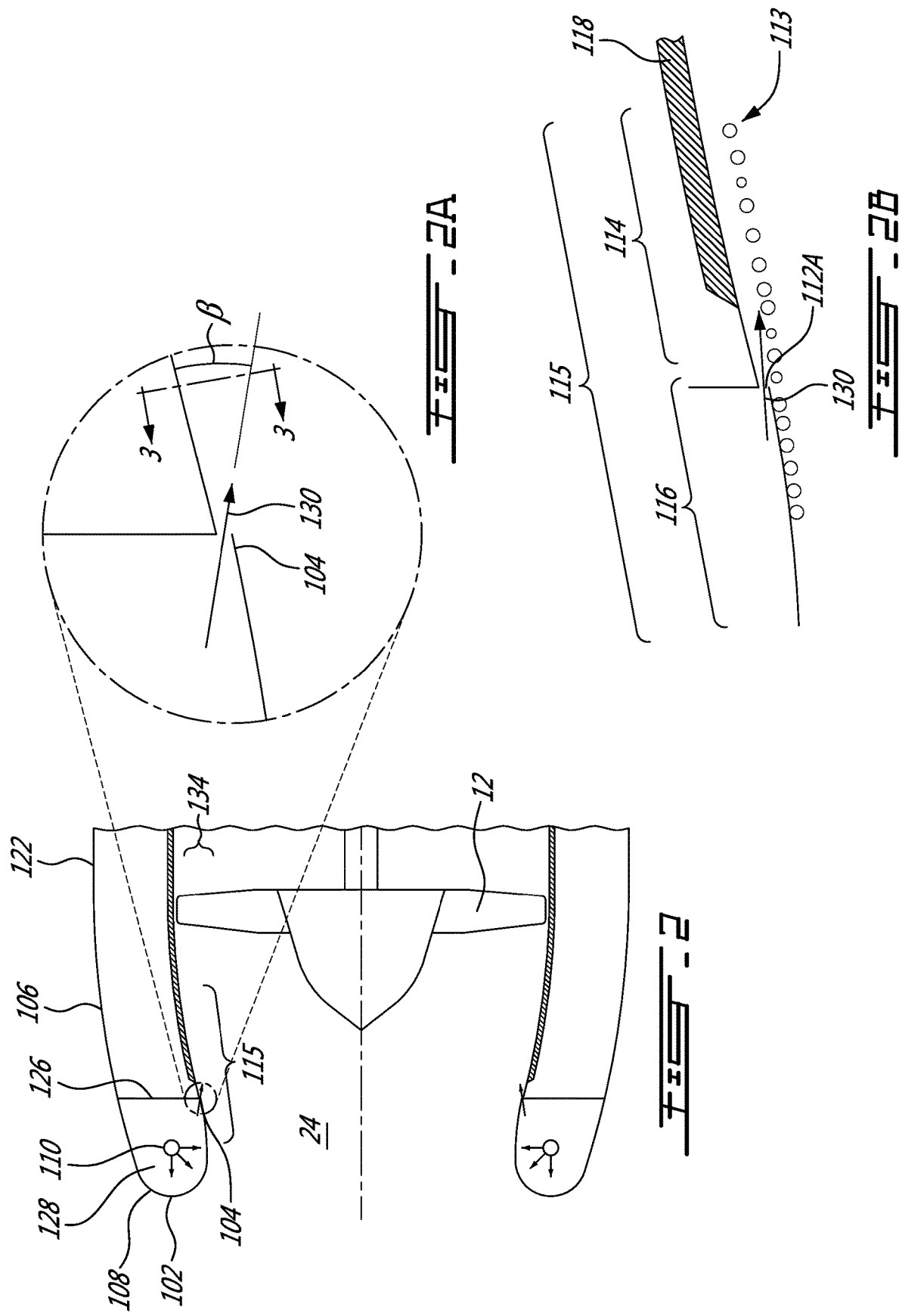

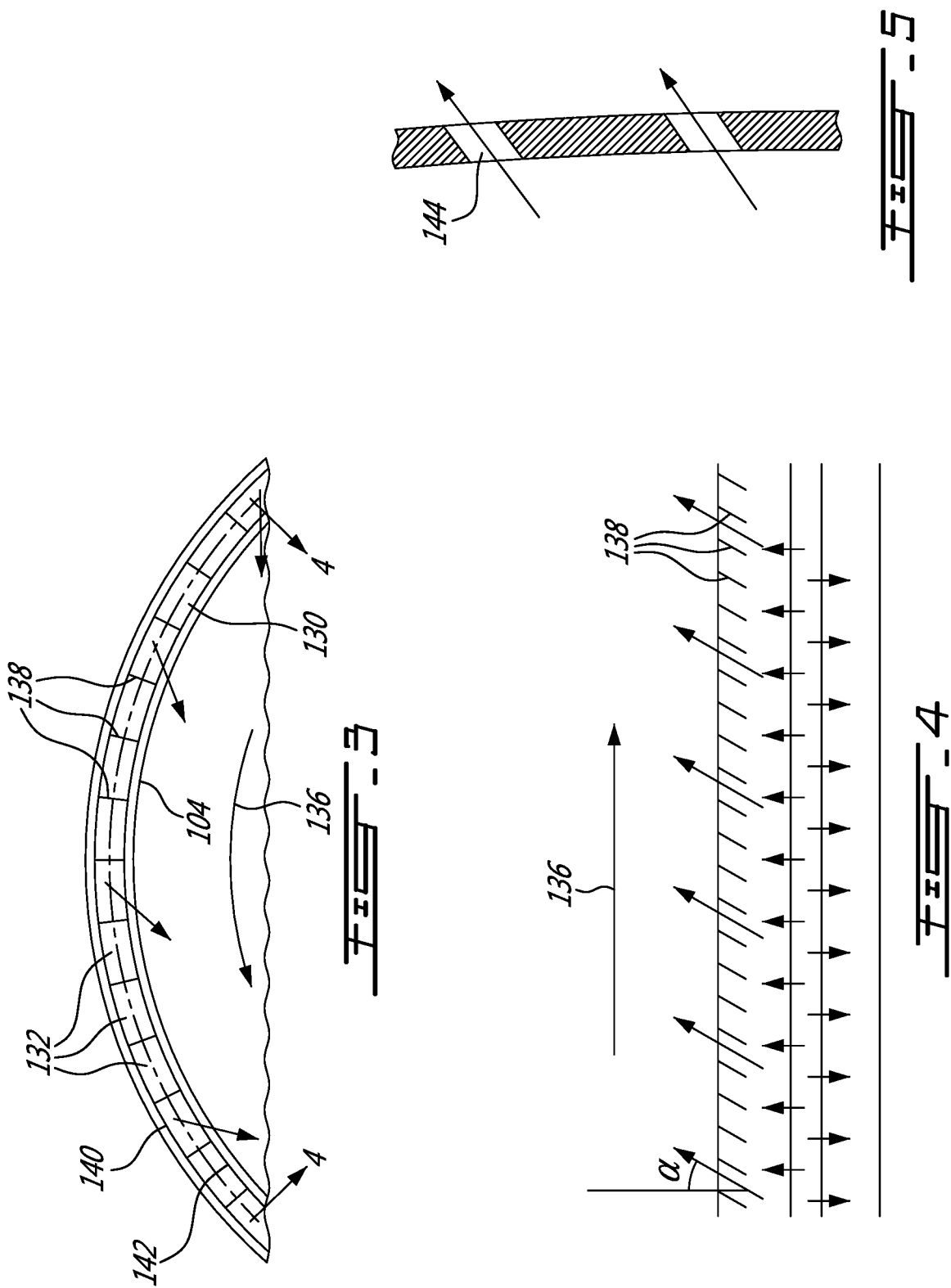

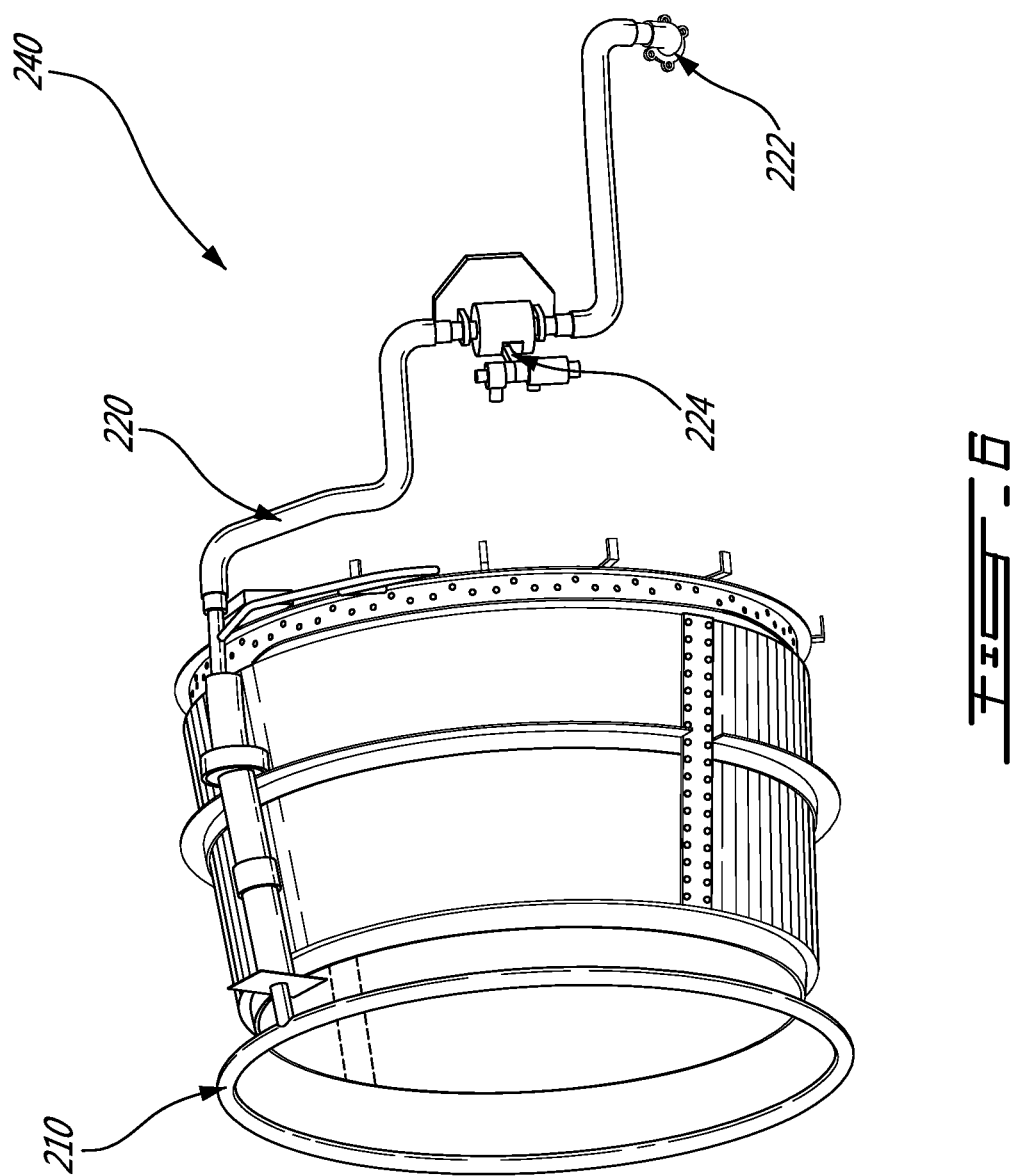

TURBOFAN ENGINE, NACELLE THEREOF, AND ASSOCIATED METHOD OF OPERATION

CROSS-REFERENCE TO RELATED APPLICATION

This application claims priority of U.S. application Ser. No. 16/699,001, filed Nov. 28, 2019, the contents of which are hereby incorporated by reference.

TECHNICAL FIELD

The application relates generally to turbofan engines and, more particularly, to ice mitigation systems therefor.

BACKGROUND OF THE ART

Engine nacelle skins, which are exposed to the environment, may be subject to ice accumulation. Ice accumulation in the vicinity of the inlet can be particularly undesirable as accumulating ice can eventually separate from the surface and represent a potential source of foreign object damage (FOD) to the fan or other internal components of the engine. To mitigate ice accumulation to the inlet portion of engine nacelles, it was known to provide heating within the nacelle, such as via hotter air bled from the compressor for instance. Although known systems were satisfactory to a certain extent, there always remains room for improvement.

SUMMARY

In one aspect, there is provided a turbofan engine nacelle, the nacelle comprising an inlet portion having a duct wall and an outer skin, the duct wall being annular around an axis and having a surface forming a radially-outer delimitation to a gas path upstream of a fan area, the duct wall extending from a rounded inlet edge of the nacelle to the fan area, a cavity located inside the inlet portion, a compressed air inlet leading into the cavity, and an outlet fluidly connecting the cavity to the gas path, the outlet having a plurality of apertures disposed circumferentially around the duct wall, the apertures sloping circumferentially.

In another aspect, there is provided a method of operating a turbofan engine, the method comprising: heating an inlet edge of a nacelle of the engine by circulating hot air in a cavity of the nacelle, thereby cooling the air; and outputting the cooled air into an axisymmetric intake flow of the turbofan engine, upstream of a fan, including directing the outputted compressed air circumferentially, a tangential inertia of the outputted cooled air thereby generating a swirl in the intake flow.

In a further aspect, there is provided a turbofan engine comprising an engine core having a core gas path extending, in serial flow communication, across a compressor section, a combustor, and a turbine section, the engine core housed within a nacelle, the nacelle having an annular front edge, the nacelle edge connecting an outer skin to an internal duct wall, the duct wall being annular around an axis and having a surface forming a radially-outer delimitation to an intake portion of gas path, upstream of a fan area, the duct wall extending from a rounded inlet edge of the nacelle to the fan area, a cavity located inside the annular front edge, a compressed air inlet leading into the cavity, and an outlet fluidly connecting the cavity to the gas path, the outlet having a plurality of apertures disposed circumferentially around and through the duct wall, the apertures sloping circumferentially, and a bleed air path connecting the compressor section to the compressed air inlet.

DESCRIPTION OF THE DRAWINGS

Reference is now made to the accompanying figures in which:

FIG. 1 is a schematic cross-sectional view of a gas turbine engine;

FIG. 2 is a schematic cross-sectional view of an intake portion of a gas turbine engine, in accordance with an embodiment, with FIGS. 2A and 2B being schematic close-up views of a portion thereof;

FIG. 3 is a cross-sectional view taken along lines 3-3 of FIG. 2A;

FIG. 4 is a cross-sectional view taken along lines 4-4 of FIG. 3, showing a first embodiment of apertures;

FIG. 5 is a cross-sectional view showing an alternate embodiment of apertures to the embodiment of FIG. 4;

FIG. 6 is an oblique view showing components of a heating system of the engine of FIG. 2.

DETAILED DESCRIPTION

FIG. 1 illustrates a gas turbine engine 10 of a type preferably provided for use in subsonic flight, generally comprising in serial flow communication an intake 20, sometimes alternately referred to as an inlet, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases, with rotary components rotating around a main axis 11. The gas turbine engine 10 is housed in a nacelle 22, which has an aerodynamically shaped external surface. In this example, the nacelle 22 forms an enclosure which is distinct from the passenger compartment of the aircraft, and more specifically, the nacelle 22 is separated from the passenger compartment by a portion of a wing of the aircraft (not shown). The area in which the blades of the fan 12 rotates can be referred to as the fan area. The portion of the nacelle which surrounds the fan 12 can be referred to as a fan case, and is typically strengthened as known in the art.

The gas turbine engine shown in FIG. 1 is of the turbofan type, and is characterized by the fact that the gas path has a common intake region 24 upstream/in front of the fan 12, and then splits off, downstream of/behind the fan 12, into a radially-inner core gas path and a radially-outer bypass path. The core gas path extends through the compressor section 14, combustor 16 and turbine section 18, while the bypass path extends around the engine core, and guides air accelerated by the fan, typically for thrust. The bypass path is formed within the nacelle 22, more specifically between a bypass duct and the engine core.

As shown in FIG. 2, in this example, the nacelle has an annular, rounded intake edge 102 which, during flight, separates a portion of the flow which is directed into the intake region 24, which will typically flow adjacent an internal duct wall 104 of the nacelle 122, from a portion of the flow which is directed around and outside the nacelle 122, which will typically flow along an external skin 106 of the nacelle 22. In this embodiment, the intake edge 102 is rounded in a manner to limit aerodynamic disruption. In the example of FIG. 2, the portion of the nacelle 122 which is in front/upstream of the fan 12 is directly exposed to the environment and is thus particularly susceptible to ice accumulation. To mitigate ice accumulation, it is relatively common, especially in medium to large engines such as the one shown in this example, to provide a cavity 128 in the rounded intake edge 102, commonly in the form of a D-duct, formed between a rounded portion 108 of the nacelle 122 and a radially-oriented annular wall 126, the latter sometimes being referred to as a bulkhead, and to supply hot air into to this cavity 128 to keep the intake edge 102 above freezing temperature. The cavity 128 can be rigid, such as formed with metal components in a D-duct configuration, but some smaller engines can use a rubber boot instead of rigid components, and can shed ice mostly by changing the pressure within the rubber boot rather than mostly by heating it.

The example cavity 128 is provided with a heater internal to the rounded portion 108. The heater can be based on circulating hot air bled from the engine core in the cavity 128, for instance, which can be achieved using a heating air conduit 110 having a plurality of apertures dissipating hotter air bled from the compressor into the cavity 128. Alternate examples can have alternate heaters. The heater can be used to heat water, in solid or liquid phase, which comes into contact with the rounded intake edge, to avoid it forming and accumulating a layer of ice, which could eventually dislodge and represent a potential FOD. The power directed to the heater can be selected, or modulated, as a function of the amount of power expected to be required to achieve this purpose, for instance.

In the example shown in FIG. 2, the hot air can be supplied throughout the engine's mission, or in some cases, it can be supplied only in some segments of the engine's mission, such as takeoff, climbing and descent for instance, while being discontinued during cruise. Self-evidently, the air supplied to the cavity needs to be hotter than the ambient air, and significantly above freezing, if it is to prevent water on the skin from freezing, or if it is to melt ice accumulations. Such hot air can typically be obtained from the engine itself. In particular, it is common to bleed air from the compressor section 14 to this end. Depending on the engine size, the temperature through the compressor section 14 can vary, and it can be preferred to avoid air which is too hot as this can pose a burden on materials used in forming the bleed air path. Accordingly, a suitable bleed air point can be selected as a function of the specific engine's particularities, while typically it will be understood that in larger engines, it may be preferred to choose a bleed air point which is earlier in the sequence of compression stages, whereas in smaller engines, it can be preferred to choose a bleed air point which is closer to the combustion chamber. FIG. 3 shows an example of a bleed air path 240 for a turbofan engine and will be discussed further below.

Although known nacelle inlet heating systems were satisfactory to a certain extent, there always remains room for improvement. Indeed, after having transferred some of its heat to the nacelle 122, including the rounded edge 108 thereof, the heating air, which may still carry heat energy stemming from the preceding compression step, can be exhausted to the atmosphere, representing a waste of energy. It can thus be preferred, at least in theory, to recuperate the remaining energy in the used heating air by evacuating it back into the engine's gas path, such as by exhausting it into the intake region 24 but this should be thought through carefully to limit introduction of any collateral aerodynamic instability.

FIG. 2 presents an example embodiment where a used heating air outlet 130 (best shown in FIG. 2A) is provided across the duct wall 104, via which used heating air is exhausted from the cavity 128 back into the intake region of the engine's gas path.

Fans 12, on the other hand, typically have solid blades which can have complex tri-dimensional shapes designed in a manner to optimize their aerodynamic, air-compression performance. However, the operating conditions change throughout the operation envelope. Indeed, the fan 12 will typically rotate faster during takeoff and climbing, than during cruise, and significantly faster than during descent and landing where the fan can be practically idle. Moreover, the speed of air across the fan can be greater during the same conditions, which can also affect the effective angle of attack. Accordingly, in situations where the effective angle of attack varies between different operation conditions, a designer must typically choose the type of operating condition for which he/she optimizes the blade angle of attack.

Many turbofan engines are designed for cruise, because cruise is the main operating point of the aircraft they are designed for. This can involve selecting an angle of attack of the blades to be optimal in the conditions which can be expected during typical cruise. However, this also means that the fan 12 may not run optimally in other conditions. While the efficiency of the fan 12 may not be much of a concern during descent and landing, it can be preferred for the fan 12 to operate as efficiently as possible during takeoff and climb. Alternatively, some aircraft can be designed for shorter missions, or for different types of missions, which can favor designing the blades in a manner to operate most efficiently during takeoff and climb, in which case they may not run optimally during cruise, which may also be undesired.

Accordingly, there may be an advantage in allowing to modulate the effective angle of attack of at least a portion of the blades, in conditions where the blades run off-design. This can be achieved, for instance, by "pre-swirling" the air flow, i.e. inducing a circumferential/tangential component to the local airspeed upstream of the fan (being understood that the fan necessarily induces a swirl into the downstream flow). Depending on the angular orientation of the pre-swirl relative to the angular orientation of the fan's rotation, pre-swirl can either increase or reduce the effective angle of attack. In view of the explanations provided above, it will be understood that there can be motivations to apply pre-swirl either one of the two relative orientations, and the designer's choice will depend on the specifics of the exact embodiment. For instance, adjusting the effective angle of attack during climb for an engine optimized for cruise may require an opposite swirl orientation to adjusting the effective angle of attack during cruise for an engine optimized for climb. To a certain extent, a pre-swirling effect can be achieved by directing used heating air into the intake region 24, upstream of the fan 12, with a circumferential/tangential speed component.

Moreover, in some cases, water, such as water stemming from ice which is melted or prevented from solidifying by the heating air, can become carried along the surface of the skin, entrained by the viscous forces exerted by the flow of air through the intake region 24. If the heated area is limited, the liquid water can flow past the heated area, only to freeze a bit deeper into the engine, forming an ice accumulation/potential source of FOD there. This can be mitigated, to a certain extent, by increasing the amount of heat power supplied to the nacelle, (hotter water will travel farther before freezing, especially if it runs along a warmer surface), but this is done at the cost of the additional power, and it is typically desired to minimize power expense. Moreover, some embodiments may have practical limitations to the amount of extension of heater range achievable by added power. To a certain extent, exhausting heating air into the intake region 24 of the engine's gas path, upstream of the fan 12, can contribute to detach water droplets from the skin, and/or to maintain detached water droplets separated from the skin.

Accordingly re-injecting the heating air into the gas path in an annular, swirling configuration, which can be achieved by using circumferentially sloping slots or vanes in a rear-facing outlet of the nacelle cavity, for instance, can generate an airflow configuration which can generally be beneficial to the engine's performance. While in theory, pre-swirling of the flow can be beneficial along the entire length of the blade, if the amount of available kinetic swirling energy is limited, which can be the case when using used heating air, it can be preferred to use it in a strategic manner, in a view of maximizing its effect. To this end, the tip portion 134 of the blades can be a strategic area for inducing such a pre-swirl for two reasons: a) since the tip portion 134 of the blades is farther away from the rotation axis than the stem, a relatively small length of the tip portion of the blades can cover a greater cross-sectional surface area during rotation than a comparable length closer to the stem; b) since the tip portion 134 of the blades is farther away from the rotation axis 11, it rotates faster than the portion closer to the stem, and its effective angle of attack can thus be more significantly affected by a change of RPM than a portion closer to the axis. Concentrating the effect of the swirl along a radially-outer tip portion 134 representing less than 10% of the length of the blade, and even less than 5% of the length of the blade, can be particularly strategic, for instance.

As best shown in FIG. 3, the outlet 130 can include a plurality of circumferentially interspaced apertures 132, generally arranged in an annular configuration. As perhaps best shown in FIG. 3, the individual apertures 132 are arranged in a manner to slope circumferentially, i.e. to have a non-zero angle α in the tangential/axial plane (see FIG. 4), and direct the used heating air it outputs partially in the circumferential orientation 136 around the engines axis 11, in a manner for the air jets exiting the individual apertures to collectively form a swirl upstream of the fan 12. The individual apertures 132 can also have more or less of an angle in the radial/axial plane, which will be discussed further below.

The plurality of individual apertures can be formed in any suitable way, and their specific design will vary depending on the specific embodiment. This choice can be affected by the manufacturing techniques retained for the surrounding components, for instance. For instance, they can be formed by a plurality of circumferentially sloping vanes positioned between two axial/annular rings; by louvered holes drilled into an annular collar or in a skin of the D-duct, for instance, or by more complex shapes which can be achieved, for instance, by additive manufacturing, soldering, or otherwise assembling different components to one another. An example illustrating sloping vanes 138 positioned between two annular sheet metal segments 140, 142 is shown in FIGS. 3 and 4, whereas FIG. 5 represents an alternate example where louvered holes 144 are drilled at an angle across the thickness of the material of the bulkhead.

In any event, the exact angle at which the used heating air is re-introduced upstream of the fan can vary depending on the intent and on the application, but a wide variety of options are possible, and it is possible to choke the outlet 130 more or less to control the pressure and flow rate in the D-duct and across the outlet, and to use vanes or louvered apertures, for instance, to give more or less of an angle α in the tangential/axial plane (circumferential angle, see FIG. 4), and more or less of an angle β in the axial/radial plane (radial angle, see FIG. 2A). Indeed, in some embodiments, it can be possible to direct the flow of used heating air efficiently towards the tip portion of the blades, which can be done to restricting the radial angle β to less than 10 degrees for instance, even less than 3 degrees for instance, and positioning the outlet 130 as close as feasible to the fan 12, in which case the design can be optimized for aerodynamic performance of the fan outside design conditions for instance. In other embodiments, it may be more difficult to direct the flow to the tip portion of the blades (the presence of acoustic panel may prevent this or otherwise force outputting the flow farther away from the fan, thus diluting the kinetic energy of the flow over a larger area and reducing the circumferential speed), in which case it may be preferred to simply optimize the design in a manner to limit any aerodynamic instability caused at the fan 12 by the presence of the used heating air flow and/or in a manner to favor water droplet separation (see FIG. 2B).

There can be a particular interest in a context where the off-design condition of the fan where fan efficiency is nonetheless desired coincides with conditions during which heating air would normally be useful in the cavity. This can be the case, for instance, in a gas turbine engine 10 where the fan blades are optimized for cruise conditions, and pre-swirl is used to improve the effective angle of attack of the blade tips during takeoff or climbing, during which the anti-icing system can be advantageously operated.

Moreover, the outlet 130's can have an edge 112A which can form a step along the duct wall's surface, in a manner that if any water circulates along the upstream portion 115 (relative to the fan 12) of the internal duct wall's surface (e.g. see FIG. 2B), as the liquid water droplets 113 reach the outlet's edge 112A, the velocity of the air outputted from the outlet 130 can contribute to its separation, and ejection, from the surface 115, after which it can remain entrained in the air flow rather than freezing and accumulating onto a cooler portion of the surface, to eventually detach and cause FOD. Indeed, small droplets of water, even when solidified into small ice fragments, can have insufficient mass to cause any damage to the engine, by contrast with larger ice accumulations. Such an action can be assisted by providing a sharp radially-inner/aft edge 112A to the outlet 130.

More specifically, in the example presented in FIG. 2A, the outlet 130 is formed in the duct wall 104 of the gas turbine engine 10, in the vicinity of the intake edge 102. The outlet 130 can be configured to form a radial step, in the form of a discontinuity in the surface 115 which delimits a recessed (or second) portion 114 of the surface 115 from a non-recessed (or first) portion 116 of the surface 115. The recessed portion 114 of the surface 115 can be offset, at the edge 112A, from the non-recessed portion 116 of the surface 115 by a distance equivalent to the "height" of the edge 112A. The outlet can be provided across a riser of the step, or adjacent to the step, across one or the other of portions 114, 116, for example. The recessed portion 114 is recessed relative to the main intake air flow. The edge 112A faces downstream relative to the movement of the water 113 along the surface, in the sense that if an imaginary Lilliputian person would walk and go up the step 112A, he would be walking against the wind flow, whereas if he would walk and go down the step, he would have the wind in its back. Otherwise said, the recessed portion 114 extends from the edge 112A both away from the edge 112A and the rounded portion 102, whereas the non-recessed portion 116 extends between the rounded portion 102 and the edge 112A.

The height of the edge 112A can vary greatly depending on the size of the engine and the specifics of the embodiment. However, for the purpose of providing an order of magnitude, it can be said here that the height of the edge 112A can be expected to be between 0.010" and 0.200" in most practical applications. Greater heights may represent a flow distortion judged as being too large, while not providing sufficient compensating advantages, whereas a height smaller than 0.010" may not be sufficient to cause ejection of the water droplets 113. The exact height for a specific application can be determined based on simulation or testing, for instance. Similarly, the sharpness of the step, i.e. the dimension of the fillet radius of the edge of the step, can vary greatly from one embodiment to another and can be chosen in view of optimizing the efficiency of a specific embodiment. Typically, the ratio of the fillet radius to the height of the step can be between 0 and 1, and the fillet radius can thus be less than 0.200", for example.

In one alternate embodiment, there is no edge, the outlet 130 is provided in the form of a plurality of holes formed directly across the radially-internal skin of the D-duct, at a solid angle found suitable to generate swirl.

In still another embodiment, the edge 112A can be the edge of a step having a riser in the form of a riser portion of the surface, which extends normal to the recessed portion 114 of the surface 115, along a distance corresponding to the height of the edge 112A. The riser can face downstream relative to the movement of the water droplets 113, or rearwardly relative to the orientation of thrust of the turbofan engine, and the outlet can be provided in the form of a plurality of apertures formed through the riser.

It will be understood that in the specific case of a turbofan gas turbine engine, the intake 20 extends axisymmetrically around the engine's main axis 11, and therefore the inlet edge 102, skin 106, and duct wall 104 can be axisymmetric around the main axis 11. In such a context, the outlet can be designed in a manner to extend around the entire circumference of the inlet 20, for instance. However, in some embodiments, it may be determined that one or more targeted circumferential portions of the inlet 20 are more prone to ice accumulation, and the outlet can be designed to extend only partially around the circumference, in coincidence with the one or more circumferential portions more prone to ice accumulation. In the case of a turbofan gas turbine engine, the duct wall 104 is an outer bypass duct wall for instance.

Returning to the illustrated example of a turbofan gas turbine engine application, the inlet edge 102 can form part of a D-duct 108 connected to a remainder of the nacelle 22, or bypass duct, as known in the art, and the heating conduit 110 can extend circumferentially within the D-duct 108, for instance. In such an embodiment, the edge 112A can coincide with, and be formed by, the junction between the D-duct 108 and adjacent sections of the nacelle 122, for instance. The heating conduit 110 can have a plurality of apertures forming heating air outlets, and be connected to a compressor to receive bleed air therefrom. An example of a possible arrangement of a such a compressor bleed air path 240 is shown in FIG. 6, where the annular heating conduit 210 is shown to be connected, via a thermally insulated pipe segment 220, to an engine bleed port 222 in the compressor section, and such an arrangement can have a pressure regulating and shut-off valve (PRSOV) 224 associated with the thermally insulated pipe segment 220, for instance.

Returning to FIGS. 2 and 2B, and the specific context of a turbofan engine, it is common for turbofan engines to have outer bypass ducts integrating acoustic panels 118 in a manner to impede sound transmission from the core engine to the passengers. In such a scenario, the outlet can be located between the intake edge 102, and the acoustic panel 118, for instance, along the radially inner skin of the nacelle.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, alternate embodiments may be adapted to engine configurations with a first compressor stage which is not a conventional fan, and which are not conventional turbofan engines. To name another example, in some embodiments, engines may be adapted for lower altitude cruise where icing conditions may occur, and may be configured to maintain anti-ice heating of the nacelle during cruise, at least when such conditions are present. Yet further modifications could be implemented by a person of ordinary skill in the art in view of the present disclosure, which modifications would be within the scope of the present technology.

The invention claimed is:

1. A turbofan engine nacelle, the nacelle comprising an inlet portion having a duct wall and an outer skin, the duct wall being annular around a central axis and having a surface forming a radially-outer delimitation to a gas path upstream of a fan area, the duct wall extending from a rounded inlet edge of the nacelle to the fan area, a cavity located inside the inlet portion, a compressed air inlet leading into the cavity, and an outlet fluidly connecting the cavity to the gas path, the outlet having a plurality of apertures disposed circumferentially around the duct wall, the apertures sloping circumferentially at an inner face of the duct wall, each of the apertures extending from an aperture inlet to an aperture outlet, the aperture outlet directed circumferentially and axially relative to the central axis.

2. The turbofan engine nacelle of claim 1 wherein the apertures slope circumferentially by at least 10 degrees.

3. The turbofan engine nacelle of claim 1 wherein the apertures further slope radially inwardly by between 3 and 45 degrees.

4. The turbofan engine nacelle of claim 1 wherein the apertures are regularly circumferentially interspaced from one another along at least ¾ of the circumference of the inner skin.

5. The turbofan engine nacelle of claim 4 wherein the apertures are regularly circumferentially interspaced from one another along the entire circumference of the inner skin.

6. The turbofan engine nacelle of claim 1 wherein the plurality of apertures are delimited by a plurality of circumferentially-interspaced, radially-oriented vanes, the vanes sloping circumferentially.

7. The turbofan engine nacelle of claim 1 wherein the plurality of apertures are defined by louvered holes.

8. The turbofan engine nacelle of claim 1 wherein the inlet portion includes a D-duct delimiting the cavity and forming the rounded inlet edge.

9. The turbofan engine nacelle of claim 8 wherein a compressed air distribution tube extends circumferentially around the D-duct, inside the cavity, the compressed air distribution tube including a plurality of apertures and being connected to the compressed air inlet.

10. The turbofan engine nacelle of claim 1 wherein a step is formed in the duct wall, the step delimiting a first portion of the surface from a second portion of the surface, the second portion of the surface being recessed relative to the first portion of the surface, the second portion of the surface extending away from both the step and the inlet edge, the outlet extending between the first portion of the surface and the second portion of the surface, through a height of the step.

11. The turbofan engine nacelle of claim 1 wherein the inner duct wall has an acoustic panel, the outlet being located along the surface, between the inlet edge and the acoustic panel.

12. A method of operating a turbofan engine, the method comprising:
heating an inlet edge of a nacelle of the engine by circulating hot air in a cavity of the nacelle, thereby cooling the air;
outputting the cooled air into an axisymmetric intake flow of the turbofan engine, upstream of a fan, including directing the cooled air circumferentially via circumferentially-distributed apertures, the apertures extending from aperture inlets to aperture outlets, wherein the aperture outlets are disposed circumferentially at an inner face of a duct wall of the inlet edge of the nacelle, the apertures sloping circumferentially towards the aperture outlets, the aperture outlets directed circumferentially and axially relative to the central axis, a tangential inertia of the cooled air thereby generating a swirl in the intake flow.

13. The method of claim 12 including directing the outputted compressed air circumferentially in the angular rotation orientation of the fan.

14. The method of claim 12 including directing the outputted compressed air circumferentially in an angular rotation orientation contrary to an angular rotation orientation of the fan.

15. The method of claim 12 further comprising concentrating the swirl in a tip portion of blades of the fan.

16. The method of claim 15 wherein further comprising sustaining a swirl flow immediately upstream of the fan, within 5% of the length of the fan blades from the tip to a stem.

17. The method of claim 16 wherein the swirl brings an effective angle of attack of the fan blades closer to an optimal angle of attack in the 5% of the length of the fan blades than in the remainder of the length of the fan blades.

18. The method of claim 12 comprising performing said steps of heating and outputting during at least one of takeoff and climb conditions of operation of the turbofan engine.

19. The method of claim 18 further comprising discontinuing said generating a swirl prior to reaching, or during, a cruise condition of operation of the turbofan engine.

20. A turbofan engine comprising an engine core having a core gas path extending, in serial flow communication, across a compressor section, a combustor, and a turbine section, the engine core housed within a nacelle, the nacelle having an annular front edge, the nacelle edge connecting an outer skin to an internal duct wall, the duct wall being annular around a central axis and having a surface forming a radially-outer delimitation to an intake portion of gas path, upstream of a fan area, the duct wall extending from a rounded inlet edge of the nacelle to the fan area, a cavity located inside the annular front edge, a compressed air inlet leading into the cavity, and an outlet fluidly connecting the cavity to the gas path, the outlet having a plurality of apertures disposed circumferentially around and through the duct wall, the apertures sloping circumferentially, each of the apertures extending from an aperture inlet to an aperture outlet, the aperture outlet directed circumferentially and axially relative to the central axis, and a bleed air path connecting the compressor section to the compressed air inlet.

* * * * *